(No Model.)
J. B. ROHRER & A. GOODHART.
CAR STARTER.
No. 259,215.  Fig. 1.  Patented June 6, 1882.
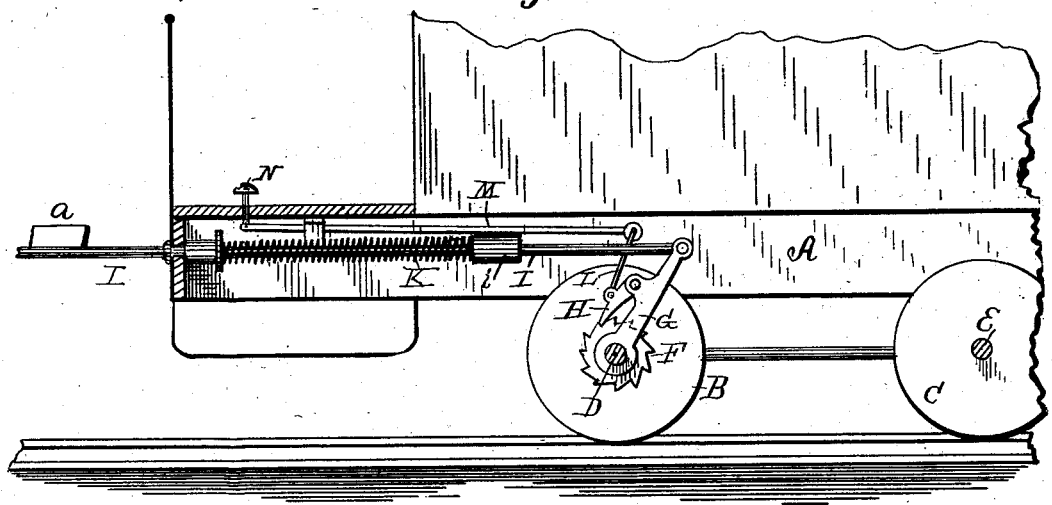
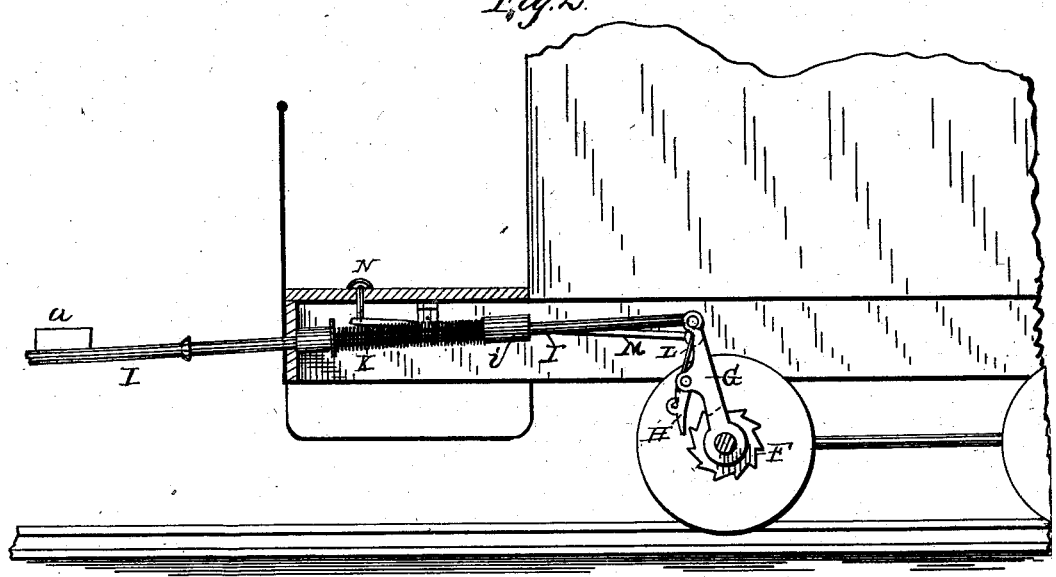
Fig. 2.
Witnesses
W. S. D. Haines
W. A. Craig
J. B. Rohrer
A. Goodhart
Inventors
By H. J. Ennis
Atty

UNITED STATES PATENT OFFICE.

JACOB B. ROHRER AND ALEXANDER GOODHART, OF CARLISLE, PA.

CAR-STARTER.

SPECIFICATION forming part of Letters Patent No. 259,215, dated June 6, 1882.

Application filed April 13, 1882. (No model.)

*To all whom it may concern:*

Be it known that we, JACOB B. ROHRER and ALEXANDER GOODHART, citizens of the United States, residing at Carlisle, in the county of Cumberland and State of Pennsylvania, have invented certain new and useful Improvements in Car-Starters, of which the following is a specification, reference being had therein to the accompanying drawings.

This invention has relation to car-starters, or mechanical movements whereby a car may be readily moved or started; and the novelty consists in the construction of the same, as will be hereinafter more fully described, and particularly pointed out in the claim.

In the accompanying drawings similar letters of reference indicate like parts of the invention.

Figure 1 is a side elevation, partly in section, of my device in position for moving the car; and Fig. 2 is a similar view, showing the position of the parts after the car has been started.

A is the frame of the car, to which are attached the axles D E, upon which axles are journaled the wheels B C.

On the front axle, D, is secured a ratchet-wheel, F, and one end of a lever, G, encompasses the axle D, so as to swing freely on it. This lever G is provided with a pawl, H, which is adapted to engage with the teeth of the ratchet F when in the position shown in Fig. 1.

To the free end of the lever G is secured a connecting-rod, I, provided with a stop or lug, *i*, and to the outer end of the rod I are secured the double-trees *a* or other drawing devices.

It will thus be seen that when the device is in the position shown in Fig. 1, by applying power to the double-trees *a*, the whole car will be gradually moved along until the lug *i* comes in contact with the frame front A; then from the momentum acquired the car can be easily kept moving, and also that the pawl swings clear of the ratchet while the car is in motion, thus preventing wear and tear as well as noise.

Of course, in the case of double-end street-cars the device will be applied to both ends of the car, so as to work either way, and in going up steep grades or hills the car can be held at a stand by allowing the pawl to engage in the ratchet, so that a slight backward motion of the car will draw the trees *a* against the front of the frame, and thus prevent the car from backing at all.

A spring, K, is attached to the rod I, so as to draw it back when the car has stopped. This throws the lever G back into position so that the pawl H engages with the ratchet F, and the forward motion of the horses causes the lever and ratchet to gradually move the car.

To the pawl H is attached a pitman, L, connecting it with a lever, M, pivoted under the platform, and having a pedal, N, within reach of the driver's foot, so that by pressing the pedal N the pawl H is thrown out of contact with the ratchet-wheel F, and the car may be moved backward in the usual manner.

Having thus described our invention, what we claim as new and useful, and desire to secure by Letters Patent of the United States, is—

The frame A, wheel B, and axle D, provided with ratchet F and lever G, in combination with the pawl H, rod I, and foot-lever M N, as and for the purpose set forth.

In testimony whereof we affix our signatures in presence of two witnesses.

JACOB B. ROHRER.
ALEX. GOODHART.

Witnesses:
J. A. M. ALLEN,
LESTER P. PORTER.